UNITED STATES PATENT OFFICE.

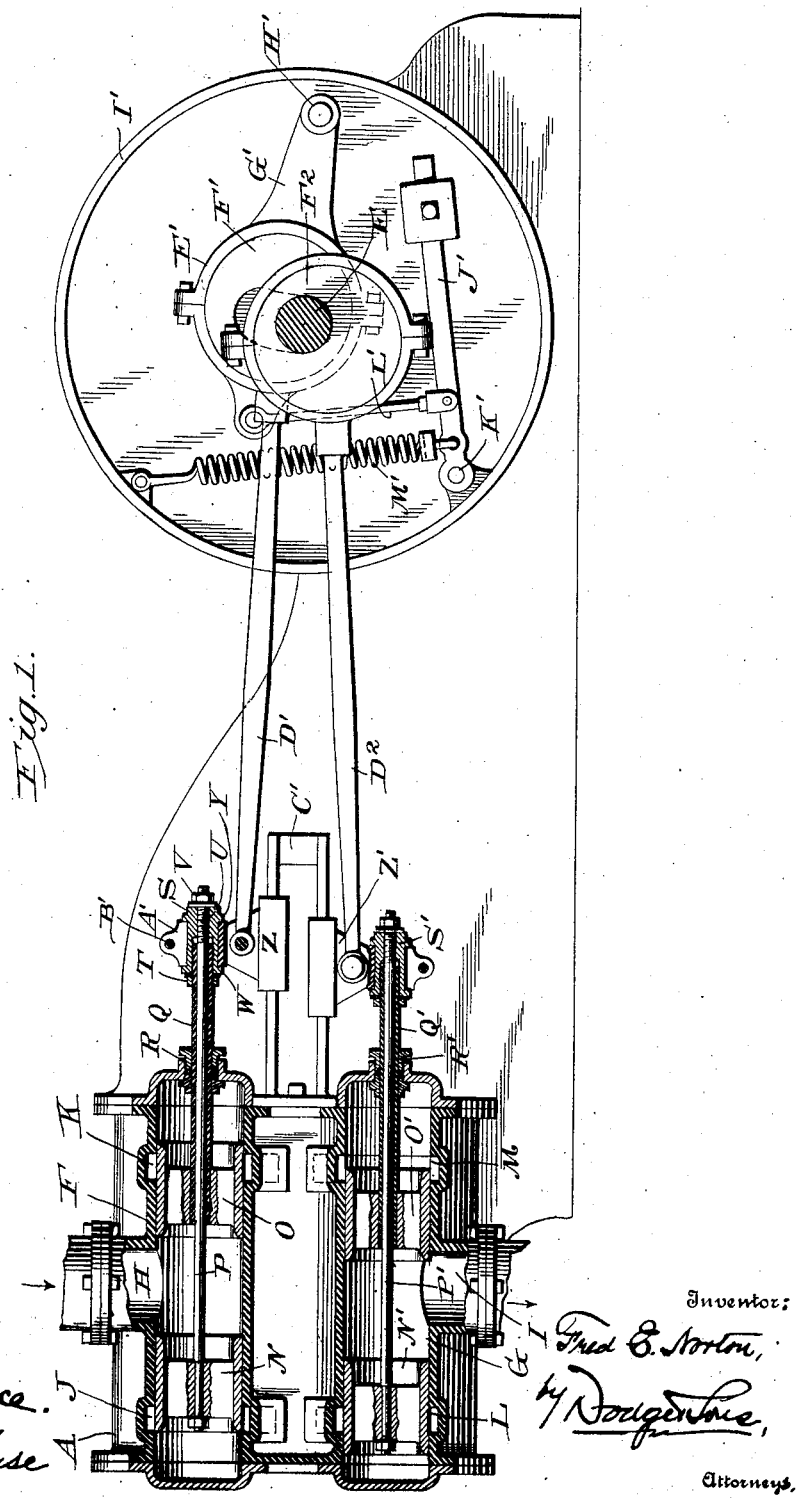

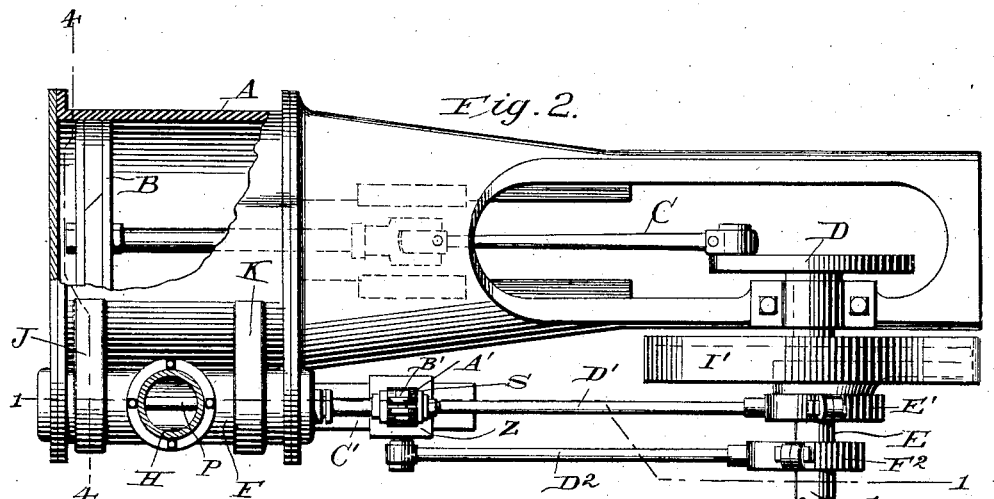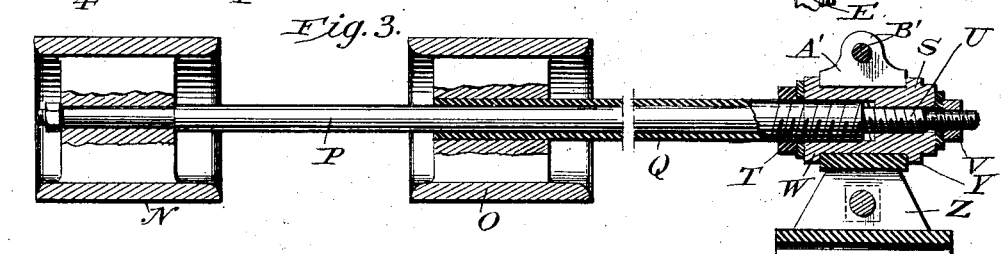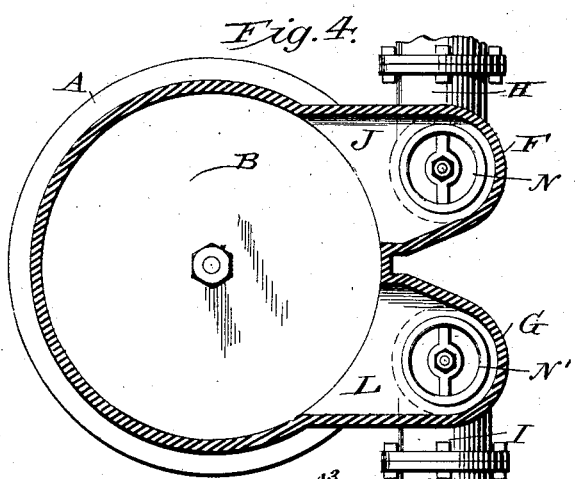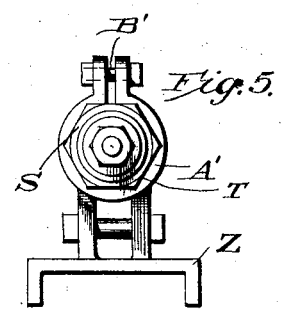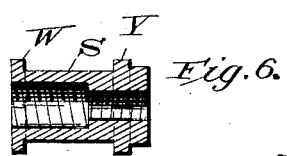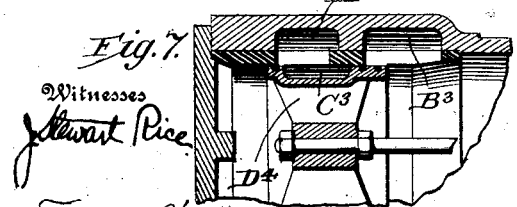

FRED E. NORTON, OF YOUNGSTOWN, OHIO.

VALVE-GEAR FOR STEAM-ENGINES.

No. 919,207.  Specification of Letters Patent.  Patented April 20, 1909.

Application filed August 12, 1907. Serial No. 388,215.

*To all whom it may concern:*

Be it known that I, FRED E. NORTON, a citizen of the United States, residing at Youngstown, in the county of Mahoning and State of Ohio, have invented certain new and useful Improvements in Valve - Gears for Steam-Engines, of which the following is a specification.

My present invention pertains to improvements in valve-gear for steam engines, the construction and advantages of which will be hereinafter set forth, reference being had to the annexed drawings, wherein:

Figure 1 is a longitudinal vertical sectional view, taken on the line 1—1 of Fig. 2; Fig. 2 a top plan view of the engine, the cylinder being broken away; Fig. 3 an enlarged detail sectional view of the valves and the connecting rods therefor; Fig. 4 a transverse vertical sectional view, taken on the line 4—4 of Fig. 2; Fig. 5 an end elevation of the supporting slide or cross-head for the valve-rods; Fig. 6 a detail sectional view of the threaded sleeve or bushing to which the valve-actuating rods are connected; and Fig. 7 a sectional detail view showing a modified form of valve-chamber used in place of the valves shown in the previous figures.

The invention relates more particularly to piston-valves for steam engines and has for its main object the provision of means whereby said valves may be adjusted without the necessity of removing them from the steam-chest or opening up the chest for adjustment of the valves. Piston-valve engines as heretofore constructed have usually been made with a single valve, combining the functions of steam and exhaust with a resulting loss in economy, due to the steam leaking directly from the steam side of the valve to the exhaust side. Where the valves are constructed according to the present invention separate valves are employed for admitting steam to opposite ends of the cylinder, and a second pair of valves is provided to control the exhaust from the cylinder. As a consequence, leakage must take place past the two valves in series, and as a result of such construction leakage will be greatly reduced. Again, the construction has the further advantage that the steam valve surfaces are exposed only to high-pressure steam, while the exhaust valves are exposed only to low-pressure steam, thus reducing the condensation and loss of heat to a minimum.

In the case of engines which may be run condensing at times while at other times they may run non-condensing, it is important that the compression be reduced when running non-condensing as compared with that which is required when running condensing.

By reason of the construction hereinafter set forth in detail, whereby the valves may be adjusted from without the valve-chest, the adjustment for changing conditions may readily be made, the valves being separated where greater compression is desired and vice versa. The construction is such that all four valves may be readily adjusted independently of each other in the manner usual for four-valve engines.

The invention is shown in its simplest form and with a single cylinder engine. It may, of course, be used in connection with a compound engine or compound tandem engine.

Referring first to Figs. 1 to 6 inclusive, A denotes the cylinder of the engine; B the piston working therein; C the pitman or driving rod connected to the piston by the piston-rod and cross-head, as is usual, the pitman being connected at its opposite end to a wrist-plate D carried upon a shaft E.

The valve-chest comprises two separate chambers F, G, live steam entering the upper chamber F through an opening H and exhaust steam passing from the chamber G through an opening or passage I. Chamber F communicates with the cylinder at opposite ends thereof through ports J and K, and the chamber G communicates with the opposite end of the cylinder through the ports or passages L and M.

Mounted within the chamber F are two piston-valves N, O, the valves working over the ports J and K, respectively. A rod P is connected to the outer valve N, said rod passing through a hollow rod or stem Q, the latter being connected at its inner end to the valve O, said hollow rod or stem Q passing through a stuffing-box R provided at the inner end of the chamber F. The outer end of the stem Q is threaded and passes into a sleeve or bushing S, it being held in its adjusted position with reference to the sleeve or bushing by a jam-nut T. The rod P is likewise provided with a threaded portion U which is screwed into a threaded opening formed in the sleeve S, the outer end of the rod being reduced and threaded for the reception of a locking nut V, which holds the rod against movement and maintains the adjustment thereof with reference to the sleeve. Said sleeve, as will be clearly seen upon reference to Figs. 3 and 6, is provided with collars W and Y, and is adapted to be held in the upper portion of a slide or cross-head Z.

As will be seen upon reference to Fig. 5, the sleeve S is held in a split yoke A' through the open end of which passes a bolt B' so that by tightening the bolt the sleeve may be held against rotation. By loosening the bolt, however, the sleeve may be released and upon rotation thereof, on loosening the jam-nuts T and V, the rod P and stem Q may be moved longitudinally with reference to the sleeve and as a consequence the valves N and O will be shifted. By having the stem and rod threaded in the reverse direction the rotation of the sleeve will move the valves N and O the same distance, and consequently effect the same adjustment of the valves with reference to the other members, assuming, of course, that the threads are of the same pitch. The pitch may, however, be different. It is conceivable, of course, that the rod and stem may be threaded in the same direction and the adjustment of each valve be effected separately by movement of the rods themselves rather than rotating the sleeve. It is likewise conceivable, so far as the generic invention is concerned, that means other than the threaded connection may be employed for holding the valve-stems or rods with reference to the sleeves.

The slide Z is mounted upon a guide C' extending outwardly from the valve-chest at one side of the engine frame and said slide is connected by a rod or pitman D' with a strap E' encircling an eccentric F'. The strap is provided with an outwardly-extending arm G' which is fulcrumed at H' upon a fly-wheel I'. A weighted arm J', fulcrumed at K', is connected to the strap through a link L', the weighted arm being normally sustained by a spring M'. As the speed of the engine increases the weight will move outwardly and as a consequence will shift the eccentric through the connections just noted and thereby cut off the supply of steam to the engine.

The exhaust valves N' and O' which control the exhaust ports L and M, are connected with a rod P' and stem Q', the stem passing through a valve-box R', said stem and rod being connected to a bushing S' in a manner similar to that described with reference to the inlet valves. A cross-head Z' is connected to the bushing S', said cross-head working upon the lower member of the guide C'. Cross-head Z' is connected by a rod or pitman D² with a fixed eccentric F² mounted upon the shaft E. The valves N' and O' may be adjusted in the same manner as the valves N and O.

In the drawings the engine is shown with the piston B on the back dead point, the direction of rotation being right-handed or clockwise. The steam valve N is on the point of opening, while the exhaust valve N' is closing. The exhaust valve O' is opening, while the steam valve O is closing. Continued motion will result in proper shifting of the valves to effect a continuous operation of the engine.

As above noted, where the engine may be run condensing at times while at other times it may be run non-condensing, the shifting of the valves is necessary. If the engine is being run condensing the sleeve S will be rotated in such direction as will separate the valves, and if the engine be run non-condensing the sleeve is rotated in the direction to throw the valves closer together. In this way the lap of the valves may be readily fixed according to the manner in which it is desired to run the engine.

In Fig. 7 a slightly modified form of the valve is shown. In said figure A³ represents the port leading to the cylinder and B³ a passage communicating with the steam-space of the valve-chest and serving, through the chamber or recess C³ formed in the outer face of the valve, to connect the steam-space through said chamber with the port A³. The steam may also pass from the steam chamber, between the wings D⁴ of the valve, into the port A³ when the valve is shifted to the right, so that said port A³ opens directly into the steam-chest. Where the valve is used as an exhaust valve the flow, of course, will be in the opposite direction.

Having thus described my invention, what I claim is:

1. An engine provided with inlet and exhaust ports; separate steam and exhaust chambers in communication with said ports; a pair of piston valves mounted in each of said chambers; means for effecting longitudinal adjustment of said valves; and means located exteriorly of the chambers for locking said adjusting means, whereby relative movement of the valves will be prevented.

2. In combination with a steam cylinder provided with inlet and exhaust ports; a valve-chamber in communication with said inlet ports; a valve-chamber communicating with the exhaust ports; a pair of piston valves mounted in each of said chambers; means for actuating said valves; means located without the chambers for effecting the adjustment of said valves with relation to the operating means, whereby the lap of the valves may be varied as desired without opening the chambers; and means likewise located without the chambers for locking said adjusting means, whereby relative movement of the valves will be prevented.

3. In combination with an engine cylinder provided with inlet and exhaust ports; a chamber communicating with said inlet ports; a chamber communicating with said exhaust ports; a pair of piston valves mounted within each of said chambers; means for operating said valves; means located without the chambers for simultaneously adjusting the valves of each pair; and means likewise located without the chambers for locking said adjusting means, whereby relative movement of the valves will be prevented.

4. In combination with an engine cylinder provided with inlet and exhaust ports; a chamber communicating with the inlet ports; a chamber communicating with the exhaust ports; a pair of piston valves mounted in each of said chambers, each pair of valves being provided with a rod extending from the outermost valve and a hollow stem extending from the innermost valve and surrounding the rod of the first valve; means located without the chambers for adjusting and for positively locking the rods, and consequently the valves, in their relatively adjusted relations, whereby the lap of the valves may be changed as desired without the necessity of opening the chambers in which said valves are located; and means for actuating the valves.

5. In combination with an engine cylinder; separate longitudinally-disposed steam and exhaust chambers; a pair of separate and separable valves mounted in each of said chambers; means located without the chambers for adjusting the valves longitudinally in said chambers; and means for locking the valves in their adjusted positions.

6. In combination with an engine cylinder; separate steam and exhaust chambers; a pair of piston valves mounted in each of said steam and exhaust chambers, the valves being arranged at opposite ends of said chambers; means for effecting the longitudinal adjustment of the valves within the chambers; and means located exteriorly of the chambers for locking the valves in their adjusted relation to each other.

7. In combination with an engine cylinder; separate steam and exhaust chambers; a pair of valves mounted in the steam chamber; a pair of valves mounted in the exhaust chamber; means located without the exhaust chamber for effecting the longitudinal adjustment of the exhaust valves; and means likewise located without said chamber for locking the valves in their adjusted relation to each other.

8. In combination with an engine cylinder; longitudinally-arranged piston valves for controlling the inlet and exhaust ports located at opposite ends of the cylinder; a stem extending outwardly from each of the outermost valves; a hollow stem extending outwardly from each of the innermost valves; and means for engaging each pair of stems and effecting a simultaneous adjustment thereof, whereby the lap of the valves with reference to the ports may be effected.

9. In an engine, the combination of a steam chamber; a pair of piston valves mounted therein and controlling the ports leading to the cylinder; means for securing adjustment of the valves toward and from each other, whereby the lap may be varied; and means located exteriorly of the steam chamber for locking said adjusting means and consequently holding the valves in their adjusted relation.

10. In an engine, the combination of a steam chamber; a pair of piston valves mounted therein and controlling the ports leading to the cylinder; a hollow rod connected to one of said valves, extending to a point without the steam chamber; a second rod connected to the other valve, extending through the hollow rod and to a point without the chamber; means for securing a relative adjustment of said rods, whereby the lap of the valves may be changed; and means for locking said rods against relative movement after they have been so adjusted, whereby relative movement of the valves will be prevented.

In testimony whereof I have signed my name to this specification in the presence of two subscribing witnesses.

FRED E. NORTON.

Witnesses:
  CHENOWETH HOUSUM,
  H. M. REIN.